C. D. MILLER.
AUTOMATIC SHUT-OFF VALVE.
APPLICATION FILED JAN. 22, 1909.
924,257.
Patented June 8, 1909.
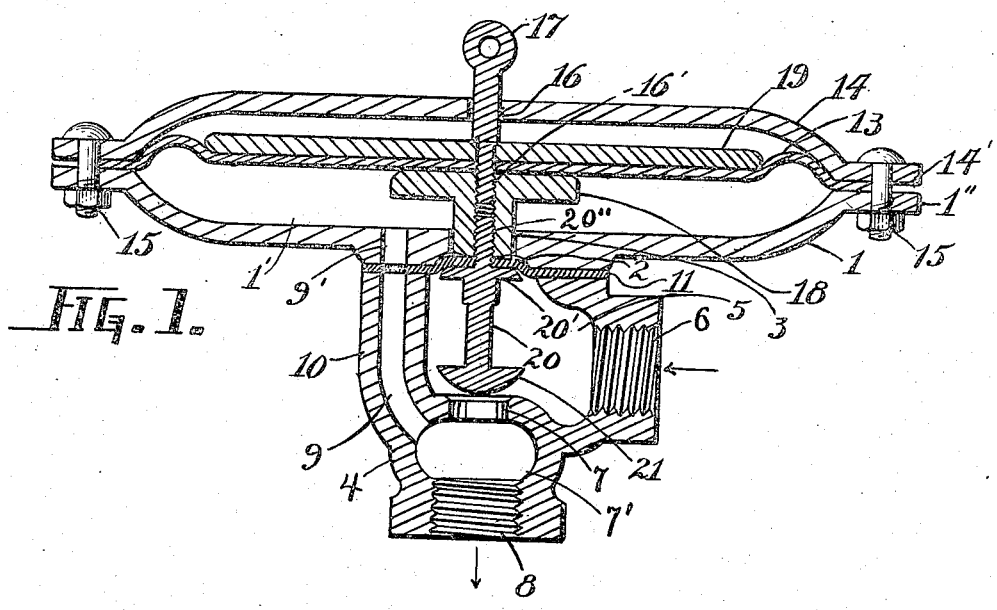
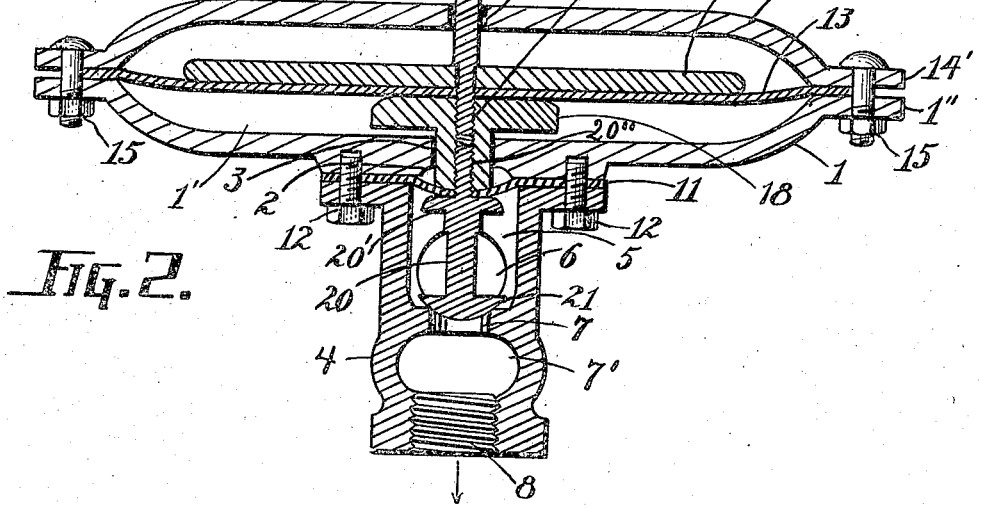

UNITED STATES PATENT OFFICE.

COSBY D. MILLER, OF ST. JOSEPH, MISSOURI.

AUTOMATIC SHUT-OFF VALVE.

No. 924,257.  Specification of Letters Patent.  Patented June 8, 1909.

Application filed January 22, 1909. Serial No. 473,761.

*To all whom it may concern:*

Be it known that I, COSBY D. MILLER, a citizen of the United States, residing at St. Joseph, in the county of Buchanan and State of Missouri, have invented certain new and useful Improvements in Automatic Shut-Off Valves, of which the following is a specification, reference being had therein to the accompanying drawing.

My invention relates to improvements in shut-off valves, which are designed to shut off, the flow therethrough, of gas or liquid under pressure; and the objects of my improvements are, first; to provide a shut-off valve, which will automatically shut off the flow of gas or liquid, therethrough, when the pressure of said gas or liquid is lowered to a certain given low pressure, from any cause, and will, thereafter, continually act as a positive shut-off for said flow, until said valve is manually opened: second; to so construct a shut-off valve, that it shall be positive in its automatic action, simple in construction, not at all liable to get out of working order, and be extremely cheap in cost of manufacture. I attain these objects by the mechanism illustrated in the accompanying drawing, in which:

Figure 1 is a longitudinal section cut vertically through the center of all the parts, showing the valve open. Fig. 2. is a transverse section, cut vertically through the center of the valve, showing said valve closed, or in shut-off position.

My invention comprises the diaphragm holder 1, having diaphragm chamber 1', formed therein and provided with annular flange 1'', formed on the outer edge thereof. Said diaphragm holder is also provided with concaved recess 2 formed in the central portion of its lower surface and has aperture 3 and port opening 9' through the bottom thereof. Valve body 4, has valve chamber 5, formed therein, and the screw threaded inlet opening 6, leading into said valve chamber. Said valve body is also provided with valve opening 7, the outlet chamber 7' and the screw threaded outlet opening, 8, leading from said valve chamber.

In the wall 10 of valve body 4 is the port 9 which connects with aperture 9' and forms communication between outlet chamber 7' and diaphragm chamber 1'.

Diaphragm holder 1 and valve body 4 have the outer edge portion of second diaphragm 11 placed between them, and are secured together by cap screws 12, seen in Fig. 2. Said diaphragm provides elastic closing means for at all times closing aperture 3, and also provides elastic packing for packing the contacting surfaces of said valve body and diaphragm holder, thereby rendering unnecessary, the machining of said surfaces, and thus cheapening the cost of manufacturing said parts.

Covering chamber 1' and with its edge resting on flange 1'', is the diaphragm 13, on the edge of which rests the annular flange 14' of the diaphragm cover 14, said flanges being secured together by bolts and nuts 15. Said cover has aperture 16 formed therethrough, of ample size to admit eye bolt 17, and to permit free passage of air therethrough. Under diaphragm 13, is the stem guide 18, guided in aperture 3. Resting on said diaphragm is the operating weight 19, said weight and stem guide being secured to, diaphragm 13, by eye bolt 17, which is screw threaded into said stem guide, at 16'.

Valve stem 20 carries valve 21 on its lower end, in valve chamber 5, said valve being adapted to close valve opening 7, as seen in Fig. 2. Said stem is provided with flange 20', formed thereon, and with the screw threaded upper portion 20'', which is passed upward through the center of second diaphragm 11 and aperture 3 and is screwed into the lower portion of stem guide 18, thereby securing said valve stem, the central portion of diaphragm 11 and said stem guide together, and forming flexible closing means for closing aperture 3, which is absolutely gas-tight, and will not become leaky, from frequent and continuous operation. Both of said diaphragms are formed of such flexible material, as is adapted to withstand the action of the gases or liquids which are to pass through the valve.

It will be seen in Figs. 1 and 2, that the diameter of aperture 3, is greater than the diameter of the lower portion of stem guide 18, which moves therein; and that aperture 16 is of greater diameter than that portion of eyebolt 17, which moves therein, thereby providing loose guiding means, wherein said stem guide and eyebolt move upward and downward, with perfect freedom.

It will be seen and understood from the foregoing, that apertures 3 and 16, and said lower portion of stem guide 18 need not be machined, thus further cheapening the cost of manufacturing, and providing a shut-off valve, of extreme sensitiveness, which will be operated with certainty, by gas or liquid, under any pressure, even though said pressure be extremely low. It will also be seen and understood, that should the alinement of valve opening 7, and valve 21, with its attached parts, be imperfect, said valve will be guided by said opening, when pressed thereon, by weight 19, and thereby be laterally moved to a perfect seat, on said opening, and that said loose guiding means and second diaphragm 11, in no way retard said lateral movement of said valve.

It will be understood that weight 19 is made of the desired weight, to overcome any certain pressure of gas, beneath diaphragm 13; which certain pressure, in the use of gas, would be such pressure, lower than normal as would render uncertain the burning of gas in any gas burner.

It will be seen and understood from the foregoing, that normal pressure of gas will pass through said valve and fill diaphragm chamber 1' through port 9 while being held manually in the position seen in Fig. 1, by the upper portion of eyebolt 17, and that after being thus filled with pressure of gas, said pressure, upward against diaphragm 13 will continually hold said diaphragm and thereby the valve 21, in open position, seen in Fig. 1, until said pressure is lowered in said valve to the heretofore described certain lower pressure, upon which weight 19 will gravitate and close the valve 21, with the parts in closed or shut-off position, seen in Fig. 2. It will be further seen and understood, that upon the return of higher, normal pressure of gas in valve chamber 5, through inlet 6, valve 21 prevents said pressure from entering port 9 and chamber 1', and that weight 19 continually holds said valve in closed, shut-off position, until said weight and its attached parts are again manually raised by eye bolt 17, to open position. This automatic closing of said valve and the continued retention of same, in closed position, prevents the casualties incident to the return of pressure of gas, after said pressure has become dangerously lowered, from any cause. The automatic action of the valve as described, also prevents back-flow of air therethrough, and thereby prevents a dangerously explosive admixture of air and gas from forming in such pipe system, (not shown,) as may be attached to said valve.

Having fully described my invention, what I claim as new and desire to secure by Letters Patent, is:—

1. In a shut-off valve, a valve body, provided with a valve chamber therein, an inlet opening, leading into said valve chamber, a valve opening, an outlet chamber and an outlet opening, leading from said valve chamber; a semispherical valve, in said valve chamber; a diaphragm holder, having a diaphragm chamber therein, and provided with a port opening and an aperture through the bottom thereof, and a concaved recess in the lower surface of said holder, as shown; a diaphragm, covering said diaphragm chamber; a weight of predetermined amount, on said diaphragm; a stem guide, under said diaphragm; an eyebolt, provided with securing means, whereby said weight and diaphragm and stem guide are secured together; a second diaphragm the outer edge portion of which forms elastic packing between said valve body and said diaphragm holder, and securing means, whereby said valve body, said second diaphragm and said diaphragm holder are secured together; a valve stem for said semispherical valve, securing means, on said stem, whereby said stem guide, the central portion of said second diaphragm and said stem, are secured together, and loose guiding means, whereby said stem is loosely guided, thereby rendering said semispherical valve, self seating, on said valve opening, together with communicating means, through the wall of said valve body and said port opening, for communicating said outlet chamber with said diaphragm chamber.

2. In a shut-off valve, the combination of a diaphragm holder, provided with a flange on the outer edge thereof, and having an aperture and a port opening through the bottom thereof, and a diaphragm chamber therein, and a concaved recess surrounding said aperture, formed in its lower surface; a diaphragm, to cover said diaphragm chamber; a cover for covering said diaphragm, said cover being provided with a flange, on the edge thereof and an aperture through the center of said cover, securing means, for securing the edge of said diaphragm between the flanges of said holder and cover; a valve body, secured to said holder, said body being provided with a valve chamber formed therein and an inlet opening, leading into said valve chamber, said body being further provided with a valve opening, an outlet chamber and an outlet opening, leading from said valve chamber, and also with a port in the wall thereof, in register with said port opening, for communicating said outlet chamber with said diaphragm chamber; a semispherical valve in said valve chamber and adapted to close said valve opening, and self seating means for seating said valve on said valve opening; a second diaphragm, for at all times closing said aperture through the bottom of said holder, said second diaphragm being adapted to form elastic packing between said valve body and said diaphragm holder; a valve stem, having its lower end formed with said semispherical valve and its upper end provided with securing means, whereby said valve stem is secured to said second diaphragm; a bolt, extending downward through said aperture in said diaphragm cover, through said weight, and through said first mentioned diaphragm, the lower end portion of said bolt being secured in said valve stem securing means, for securing said weight, said first mentioned diaphragm and said valve stem together; and loose guiding means, whereby said valve stem and said semispherical valve are loosely guided.

In testimony whereof I affix my signature in the presence of two witnesses.

COSBY D. MILLER.

Witnesses:
C. T. BRYANT,
S. MOSER.